(12) United States Patent
Takahashi

(10) Patent No.: US 7,529,466 B2
(45) Date of Patent: May 5, 2009

(54) SIGNAL PROCESSING METHOD AND SIGNAL PROCESSING APPARATUS

(75) Inventor: Yasuaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1163 days.

(21) Appl. No.: 10/212,542

(22) Filed: Aug. 5, 2002

(65) Prior Publication Data

US 2003/0031458 A1 Feb. 13, 2003

(30) Foreign Application Priority Data

Aug. 6, 2001 (JP) ............................. 2001-238209

(51) Int. Cl.
*H04N 7/00* (2006.01)
*H04N 5/91* (2006.01)
*H04N 7/64* (2006.01)
*H04N 5/00* (2006.01)

(52) U.S. Cl. ..................... 386/95; 386/83; 386/114; 386/125; 386/126

(58) Field of Classification Search .................. 386/46, 386/83, 95, 114, 125, 126; 382/181, 218, 382/219, 220, 221; 282/221
See application file for complete search history.

(56) References Cited

U.S. PATENT DOCUMENTS

| | | | | |
|---|---|---|---|---|
| 4,975,974 A | * | 12/1990 | Nishijima et al. | 382/221 |
| 5,497,244 A | * | 3/1996 | Chargin et al. | 386/109 |
| 5,499,057 A | * | 3/1996 | Kondo et al. | 348/607 |
| 5,594,809 A | * | 1/1997 | Kopec et al. | 382/161 |
| 6,536,037 B1 | * | 3/2003 | Guheen et al. | 717/151 |

* cited by examiner

*Primary Examiner*—Thai Tran
*Assistant Examiner*—Hung Q Dang
(74) *Attorney, Agent, or Firm*—Frommer Lawrence & Haug LLP; William S. Frommer; Thomas Presson

(57) ABSTRACT

A signal recorded in a work area is read for a predetermined time, the signal is assumed to be a candidate signal, and this signal is stored in a memory. A signal differing from the candidate signal is read for a predetermined time, the signal is assumed to be a comparison signal, and the signal is stored in another memory. A data comparison circuit determines whether or not the candidate signal and the comparison signal are signals with identical content are the same. When it is determined that the contents, the candidate signal is stored in a database area. A signal which is determined to have the same content as that of the candidate signal stored in the database area is deleted in such a manner that the signal can be recovered from the work area. A signal with identical content can easily be detected, and deletion of content recorded in a duplicate manner makes it possible to efficiently use a recording device.

14 Claims, 5 Drawing Sheets

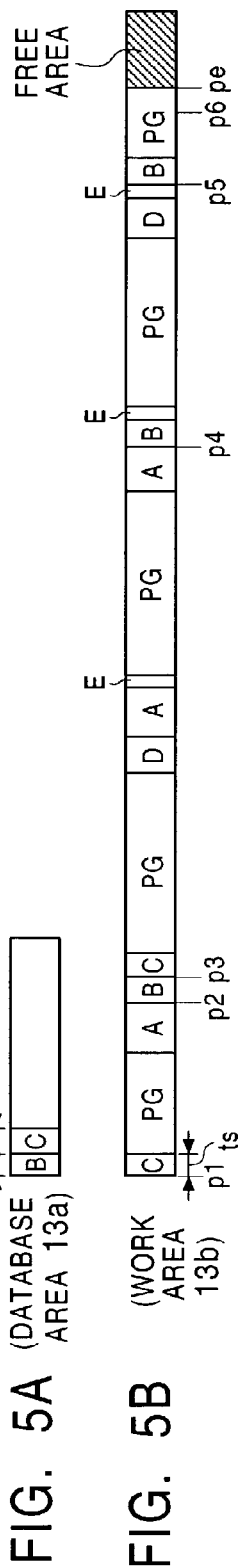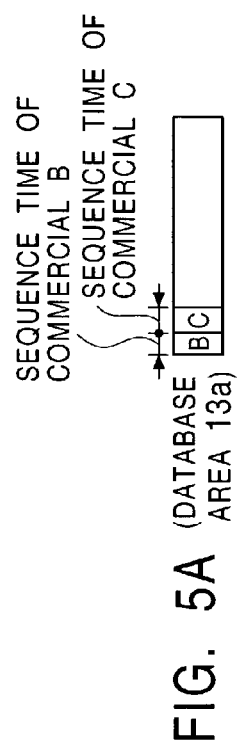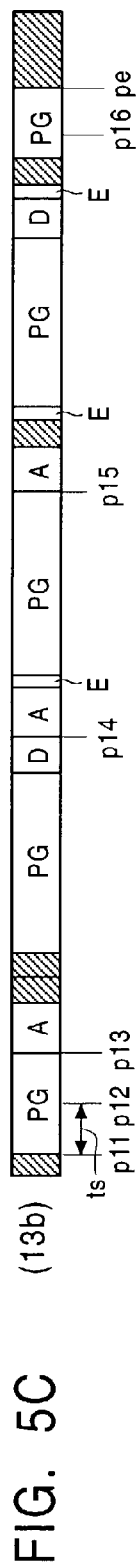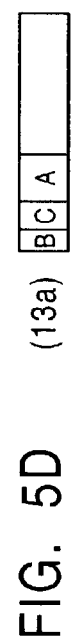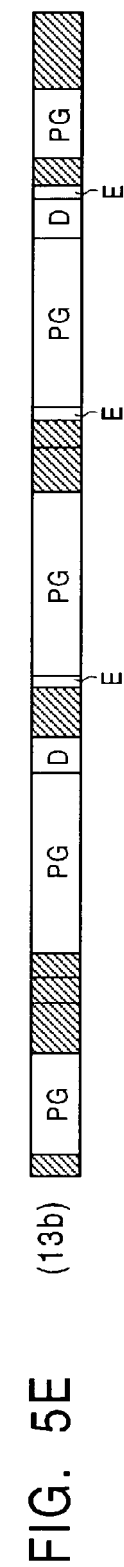

SIGNAL PROCESSING METHOD AND SIGNAL PROCESSING APPARATUS

BACKGROUND OF THE INVENTION

1. Field of the Invention

The present invention relates to a signal processing method and a signal processing apparatus. More particularly, the present invention is designed to read a candidate signal and a comparison signal for a predetermined time from the signals of content recorded in recording means and to detect a signal with identical content by comparing the candidate signal with the comparison signal. Furthermore, when the signal with identical content is detected, this signal is stored, and the signal which is the same as the stored signal is deleted from the recording means. In the deletion of this signal, by deleting the signal, the recording means is efficiently used in such a manner that the deleted signal can be determined.

2. Description of the Related Art

In recent years, as the capacity of recording means, for example, optical disks and hard disks capable of performing a random access operation, becomes larger, not only computer data, but also various content signals, for example, audio data and moving image data, have been recorded. Furthermore, in removable and portable recording media, similarly to conventional audio cassette tapes and video cassette tapes, signals of broadcast programs, etc., have been recorded in such a manner that these signals can be stored as signals of video and audio content. In addition, when a recording medium is provided in a fixed manner within a signal processing apparatus, a broadcast program which cannot be viewed is temporarily recorded by a timer reservation operation. Also, a recording operation is started from a position at which a broadcast program cannot be viewed in real time, and when a situation capable of being viewed is reached, not only the recording operation, but also a playback operation of the broadcast program recorded on the recording medium is performed at the same time, so that an operation for allowing a desired broadcast program to be continuously viewed is performed. Furthermore, when a recording and a playback of a program are performed simultaneously, the program playback position is also brought closer to the real-time broadcast program being recorded by speeding up the playback speed or by skipping commercial portions.

In recording media, such as video cassette tapes, which are incapable of performing a random access operation, signals of content, such as broadcast programs, are recorded in sequence, and when only a desired program portion is to be played back, a tape fast-forwarding operation and a tape rewinding operation for skipping a portion which is not viewed must be performed. In this manner, since a tape fast-forwarding operation and a tape rewinding operation must be performed each time for a playback in a portion which is not viewed, operations become complicated. For this reason, for example, when a television broadcast program is to be recorded/played back, it is performed such that a sound mode switching position is detected and a commercial portion is skipped. In this process of skipping a commercial portion, it is performed such that that a commercial portion of a stereo mode, which is inserted into a program in which sound is in a monaural mode, or a commercial portion of a stereo mode, which is inserted into a program of a bilingual sound mode, is determined from the switching position of the sound mode, and this determined commercial portion is automatically skipped. However, in a system which determines such a sound mode switching position, a commercial portion of a stereo mode, inserted into a program of a stereo mode, cannot be detected.

Furthermore, there are cases in which signals, of which contents are the same, are recorded in a duplicated manner on recording media. For example, when a desired broadcast program is to be recorded on a recording medium, there are cases in which a commercial of the same content is repeatedly broadcast in the middle of the program. In such a case, commercial signals of the same content will be recorded in a duplicated manner. Furthermore, when a serialized drama is to be recorded collectively on one recording medium, the signals of the opening portion and the ending portion, in which the content is the same, are recorded in a duplicated manner, and thus, the recording medium will not be used efficiently.

SUMMARY OF THE INVENTION

Accordingly, an object of the present invention is to provide a signal processing method and a signal processing apparatus, which are capable of easily detecting signals with identical content, and capable of efficiently using recording means.

To achieve the above-mentioned object, in one aspect, the present invention provides a signal processing method comprising the steps of: reading a signal for a predetermined time from recording means in which signals of content are recorded, assuming the signal to be a candidate signal, reading a signal differing from the candidate signal for the predetermined time from the recording means, and assuming the signal to be a comparison signal; comparing the candidate signal with the comparison signal in sequence by shifting a signal reading position of the candidate signal and a signal reading position of the comparison signal to generate a comparison result; and detecting, based on the comparison result, a signal of identical content from the recording means.

In another aspect, the present invention provides a signal processing apparatus comprising: recording means for recording a signal of content; candidate signal holding means for reading, as a candidate signal, a signal for a predetermined time from the recording means and storing the candidate signal; comparison signal holding means for reading, as comparison signal, a signal for the predetermined time, except the candidate signal from the recording means and storing the comparison signal; comparison means for comparing the candidate signal stored in the candidate signal holding means with the comparison signal stored in the comparison signal holding means in order to determine whether or not the content of the candidate signal matches the content of the comparison signal, and for generating a comparison result; and control means for supplying a signal for the predetermined time from the recording means to the candidate signal holding means and the comparison signal holding means, for shifting the signal reading position of the candidate signal from the recording means and the signal reading position of the comparison signal therefrom, and for detecting a signal with identical content from the recording means on the basis of the comparison result of the comparison means.

According to the present invention, a signal for a predetermined time is read from the recording means in which signals of content are recorded, and the signal is assumed to be a candidate signal. A signal, differing from the candidate signal, for the predetermined time is read from the recording means, and the signal is assumed to be a comparison signal. The candidate signal and the comparison signal are compared with each other in sequence by shifting the signal reading position of a candidate signal and the signal reading position of a comparison signal, and based on the comparison result, the signals with identical content are detected from the recording means. As a result, when signals with identical content are repeatedly recorded like commercials, the signals of content recorded in a duplicate manner can easily be detected.

In the comparison between the candidate signal and the comparison signal, the amount of error between the candidate signal and the comparison signal is accumulated for a predetermined time, and this is assumed to be a determination value. When this determination value is less than a determination reference value, it is determined that the candidate signal and the comparison signal are signals with identical content. Therefore, it is possible to easily determine whether or not the signals are signals with identical content.

Furthermore, the signal reading position of a comparison signal from the recording means is shifted in sequence. When the reading of the signal which is assumed to be a comparison signal from the recording means is completed, by shifting the signal reading position of a candidate signal from the recording means, the candidate signal is updated. The signal reading position of a comparison signal from the recording means is shifts in sequence. As a result, it is possible to reliably detect the signal with identical content recorded in a duplicate manner in the recording means.

Furthermore, since the predetermined time is changed and the candidate signal and the comparison signal are read, identical content can be also detected although the time length is different like, for example, commercials of 15 and 30 seconds.

Furthermore, when the signals are determined to be signals with identical content, the candidate signal is stored in the candidate signal storage means, and when the candidate signal is stored in the candidate signal storage means, noise of the candidate signal is eliminated by using a comparison signal which is determined to be a signal with identical content. As a result, signals with identical content can be formed into a database as satisfactory signals.

Furthermore, when the candidate signal is stored in the candidate signal storage means, the candidate signal stored in the candidate signal storage means is read, and a signal with identical content is detected from the recording means. When the reading of the candidate signal recorded in the candidate signal storage means is completed, a signal is read from the recording means, and the signal is assumed to be a candidate signal. As a result, a signal with identical content can be efficiently detected by using the signal with identical content, which is already detected and stored in the candidate signal storage means.

In addition, since a signal with identical content to that of the candidate signal stored in the candidate signal storage means is deleted in such a manner that the signal can be recovered, it is possible to efficiently record signals in the recording means.

BRIEF DESCRIPTION OF THE DRAWINGS

FIGS. 5A, 5B, 5C, 5D, 5E, 5F, and 5G show signal recorded states of a database area and a work area.

DESCRIPTION OF THE PREFERRED EMBODIMENTS

Figure 1:
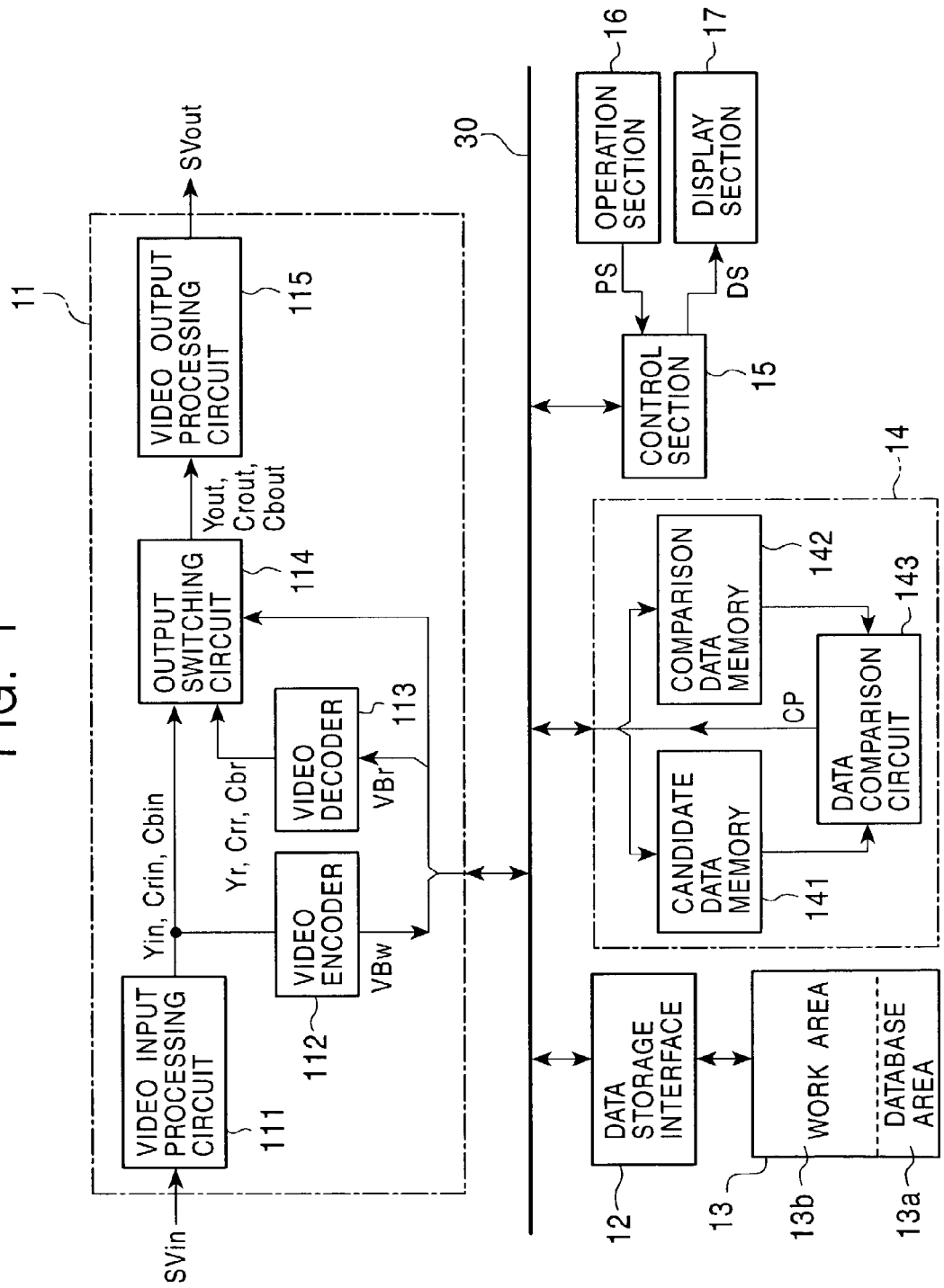
FIG. 1 shows the configuration of a signal processing apparatus according to an embodiment of the present invention.

Embodiments of the present invention will be described below with reference to the drawings. FIG. 1 shows the configuration of a signal processing apparatus capable of recording/playing back a television broadcast program by using a data storage section.

When a video signal SVin of a television broadcast program is supplied to a video input processing circuit 111 of a signal processing section 11, the video input processing circuit 111 generates a digital luminance signal Yin and digital color-difference signals Crin and Cbin from the video signal SVin and supplies the signals to a video encoder 112 and an output switching circuit 114.

The video encoder 112 performs a coding process of the MPEG (Moving Picture Experts Group) method which is standardized as, for example, ISO/IEC 13818-2, in order to generate a video coded signal VBw. This generated video coded signal VBw is supplied to a data storage interface 12 via a bus 30. Furthermore, the data storage interface 12 also performs a coding process on a luminance signal Yd and color-difference signals Crd and Cbd, supplied from a comparison processing section 14 (to be described later), in order to generate a video coded signal VBd, and supplies the signal to the data storage interface 12.

A data storage section 13 is connected to the data storage interface 12. The data storage section 13 is formed by using recording means, for example, a recording medium, such as a magnetic disk, an optical disk, or a semiconductor memory, capable of performing random access, and has a database area 13a and a work area 13b. Here, the data storage interface 12 writes and reads a video coded signal to and from the data storage section 13.

The data storage interface 12 is formed by using a memory of a plurality of banks or a plurality of memories. The data transfer rate between the data storage interface 12 and the data storage section 13 is higher than the transfer rate between the video encoder 112 and the video coded signal VBw. Here, the video coded signal VBw, for example, for one frame, supplied from the video encoder 112 is temporarily stored in one bank, and this stored recording video coded signal VBw is recorded in the data storage section 13 for an assigned processing period (time slot). Furthermore, the video coded signal VBw which is supplied while the stored video coded signal VBw is recorded in the data storage section 13 is temporarily stored in a different bank. On the other hand, when a video coded signal VBr recorded in the data storage section 13 is to be read, a desired video coded signal is read from the data storage section 13 in a processing time period differing from the processing time period used to record the video coded signal VBw in the data storage section 13, and this signal is temporarily stored as a video coded signal VBr in a bank in which a video coded signal is not stored. Furthermore, this stored video coded signal VBr is supplied in sequence to the video decoder 113, and the video coded signal VBr read while the stored video coded signal VBr is supplied to the video decoder 113 is temporarily stored in a different bank.

In the manner described above, the supply of the video coded signal VBw to the data storage interface 12 from the video encoder 112, and the supply of the video coded signal VBr to the video decoder 113 from the data storage interface 12 become possible at the same time, and writing and reading of a video coded signal are performed separately at a high speed between the data storage interface 12 and the data storage section 13. Thus, it becomes possible to perform recording and playback of signals at the same time.

The video decoder 113 performs a process for decoding the supplied video coded signal VBr. A luminance signal Yr and color-difference signals Crr and Cbr, obtained by this decoding process, are supplied to an output switching circuit 114. Furthermore, the video decoder 113 supplies the luminance signal Yr and the color-difference signals Crr and Cbr to the comparison processing section 14 via the bus 30.

When an image based on signals supplied to the video input processing circuit 111 are to be displayed in accordance with a control signal SE from the control section 15, the output switching circuit 114 selects a luminance signal Yin and color-difference signals Crin and Cbin supplied from the video input processing circuit 111, and supplies the signals as an output luminance signal Yout and output color-difference signals Crout and Cbout to a video output processing circuit 115. Furthermore, when a video coded signal recorded in the data storage section 13 is reproduced to display an image, the output switching circuit 114 selects a luminance signal Yr and color-difference signals Crr and Cbr supplied from the video decoder 113, and supplies the signals as an output luminance signal Yout and output color-difference signals Crout and Cbout to the video output processing circuit 115.

By using the supplied luminance signal Yout and the supplied color-difference signals Crout and Cbout, the video output processing circuit 115 performs a D/A conversion process and an encoding process by using video signals, for example, a luminance signal and color-difference signals, compatible with an image display device connected to a signal processing apparatus 10, adds a synchronization signal in order to generate an analog video output signal SVout, and outputs the signal.

The comparison processing section 14 has a candidate data memory 141 which is candidate signal holding means, a comparison data memory 142 which is comparison signal holding means, and a data comparison circuit 143 which is comparison means. The comparison processing section 14 compares the candidate signal stored in the candidate data memory 141 with the comparison signal stored in the comparison data memory 142, generates a comparison result signal CP indicating whether or not these are signals with identical content, and supplies the signal to the control section 15.

An operation section 16 is connected to the control section 15. By generating a control signal in accordance with an operation signal PS from the operation section 16 and by supplying the signal to each section, the control section 15 performs control so that an operation corresponding to the operation in the operation section 16 is performed in the signal processing apparatus 10. Furthermore, a display section 17 is connected to the control section 15. A display signal HS is supplied from the control section 15 to the display section 17, so that the operating status of the signal processing apparatus 10 and various types of information are displayed on the display section 17.

Furthermore, in the control section 15, signals which are to be stored in the candidate data memory 141 and the comparison data memory 142 of the comparison processing section 14 are controlled, and based on the comparison result signal CP supplied from the data comparison circuit 143, a duplicate handling process for detecting, registering, and deleting a duplicate portion is performed. That is, a signal with identical content to that of the signal registered in the database area 13a having a function as candidate signal storage means is detected from the signals recorded in the work area 13b, and is deleted. This deleted signal is placed in a recoverable state. The signal with identical content is detected from the signals recorded in the work area 13b, this duplicate signal is registered in the database area 13a, and the registered signal is deleted. This deleted signal is placed in a recoverable state.

Next, a duplicate handling process in the signal processing apparatus will be described below by using FIG. 2 to FIGS. 5A to 5G.

In step ST1 of FIG. 2, it is determined whether or not a registered video coded signal (hereinafter referred to as a "registered signal") exists in the database area 13a of the data storage section 13. Here, when video coded signals in commercial units are recorded as registered signals in the database area 13a, the process proceeds to step ST2. When a registered signal does not exist, the process proceeds to step ST21 of FIG. 3.

In step ST2, the number of registered signals is set to "n", and then the process proceeds to step ST3, where the first registered signal is specified. Next, in step ST4, the recording time of the specified registered signal is set to "ts", and then the process proceeds to step ST5. In step ST5, since the commercial signal is generally set to a multiple of 15 seconds, the recording time when the commercial signal is assumed to be a registered signal (hereinafter referred to as a "sequence time") is also made to be a multiple of 15. For example, as shown in FIG. 5A, when signals of a commercial B and a commercial C are recorded as the registered signals in the database area 13a, "n=2" is set. Furthermore, when the sequence time of the commercial B is "30 seconds", "ts=30" is set.

In step ST5, the specified registered signal is read, the signal is decoded by the video decoder 113, and then the signal is stored as a candidate signal in the candidate data memory 141 of the comparison processing section 14. Then, the process proceeds to step ST6.

In step ST6, a signal recorded position of the content having the same content as that of the candidate signal stored in the candidate data memory 141 is detected in accordance with the video coded signal recorded in the work area 13b of the data storage section 13.

Figure 4:
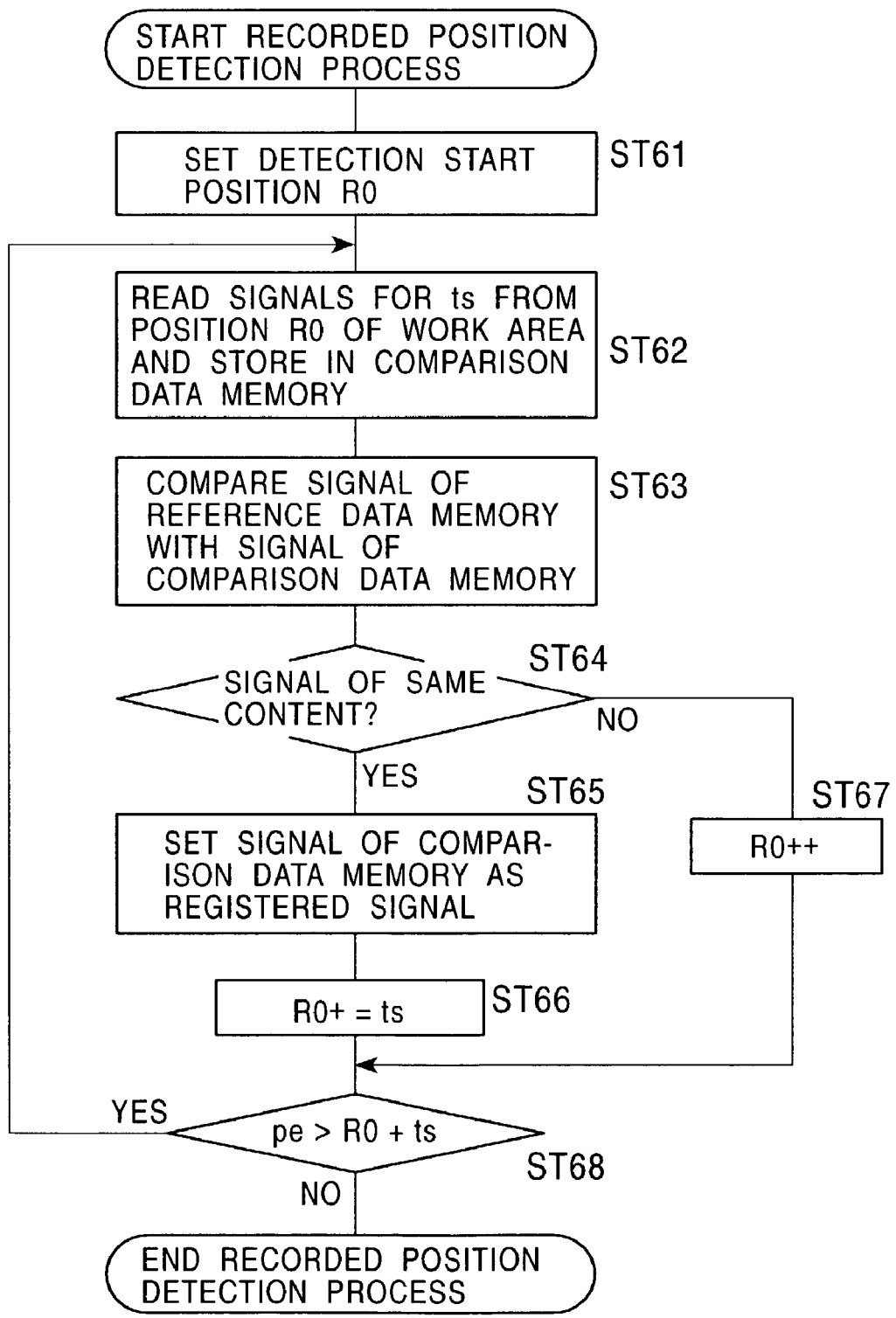
FIG. 4 is a flowchart showing a recorded position detection process.

FIG. 4 is a flowchart showing a recorded position detection process. In step ST61, a detection start position R0 in the work area 13b is set, and then the process proceeds to step ST62. In step ST62, a video coded signal for a sequence time "ts" from the detection start position R0 is read from the work area 13b of the data storage section 13, and the signal is decoded by the video decoder 113. Thereafter, the signal is stored as a comparison signal in the comparison data memory 142 of the comparison processing section 14, and then the process proceeds to step ST63.

In step ST63, the data comparison circuit 143 compares the candidate signal stored in the candidate data memory 141 with the candidate signal stored in the comparison data memory 142, and generates a comparison result signal CP indicating whether or not these are signals with identical content, and then the process proceeds to step ST64.

In the generation of this comparison result signal CP, based on the candidate signal of an SK frame for a time corresponding to the sequence time "ts", stored in the candidate data memory 141 and the comparison signal of the SK frame, stored in the comparison data memory 142, the sum of the absolute value of the difference value is determined from the difference value of the signal of each pixel in the first frame, and this is assumed to be the amount of error between the candidate signal and the comparison signal in the first frame. Furthermore, the amount of error at each frame is computed up to the SK-th frame and is accumulated, and this is assumed to be a determination value. Here, when the contents are identical, the candidate signal and the comparison signal become nearly identical, and therefore, the determination value becomes smaller. For this reason, depending on whether or not the determination value such that the amount of error for the sequence time "ts" accumulated is less than the determination reference value which is set in advance, it is possible to easily determine whether or not these are signals with identical content.

In step ST64, when it is determined that, based on the comparison result signal CP, the candidate signal and the comparison signal are signals with identical content, the process proceeds to step ST65. When it is not determined that the candidate signal and the comparison signal are signals with identical content, the process proceeds to step ST67.

In step ST65, after the registered signals of the database area 13a, which are the candidate signal and the comparison signal stored in the comparison data memory 142, are determined to be signals with identical content, the comparison signal stored in the comparison data memory 142 is set as a registered signal, and the process proceeds to step ST66. In step ST66, the sequence time "ts" is added to the detection start position R0 so as to set the position to a new detection start position R0, and the process proceeds to step ST68.

When it is not determined in step S64 that the signals are signals with identical content, the process proceeds to step ST67, where, for example, one frame is added to the detection start position R0 so as to set the position to a new detection start position R0, and then the process proceeds to step ST68. When a signal recorded in the work area 13b is deleted as will be described later, the detection start position R0 is set with this area being skipped.

In step ST68, it is determined whether or not the position at which the sequence time "ts" is added to the detection start position R0 exceeds a recording end position "pe" in the work area 13b. Here, when the position does not exceed the recording end position "pe", the process returns to step ST62, where a video coded signal for the sequence time "ts" from the new detection start position R0 is read from the work area 13b of the data storage section 13, and a determination as to whether or not the read candidate signal and the read comparison signal are signals with identical content is made in the manner described above. Furthermore, when the recording end position "pe" is exceeded, the signal for the sequence time "ts" cannot be stored in the comparison data memory 142. Therefore, the recorded position detection process is terminated, and the process returns to step ST6 of FIG. 2.

Here, as shown in FIG. 5B, when signals of a program PG and commercials A to E are recorded in the work area 13b, as a result of the above-described processes, the signal of the commercial B, which is registered first, is stored as a candidate signal in the candidate data memory 141, the detection start position R0 is set to a start position p1 of the work area 13b, and the signal for the sequence time of the commercial B from the position p1 is stored as a comparison signal in the comparison data memory 142.

Here, since the commercial C is recorded at the start portion of the work area 13b, the content of the candidate signal stored in the candidate data memory 141 does not match the content of the comparison signal stored in the comparison data memory 142, and the detection start position R0 is moved by one frame. Thereafter, when the detection start position R0 reaches a position p2 at which the commercial B is recorded, it is determined that the content of the candidate signal stored in the candidate data memory 141 matches the content of the comparison signal of the comparison data memory 142. Therefore, the signal for the sequence time "ts" from the position p2, which is the signal stored in the comparison data memory 142, is set as the registered signal.

When the signal for the sequence time "ts" from the position p2 is set as the registered signal, a position p3 at which the sequence time "ts" has passed from the position p2 is set as a new detection start position R0. Hereafter, as a result of performing the same processing, signals for the sequence time "ts" from positions p4 and p5, which are the signals of the commercial B, are set as the registered signals.

Furthermore, when a position p6 is set as the detection start position R0 and the position at which the sequence time "ts" is added to the detection start position R0 exceeds the recording end position "pe" in the work area 13b, the above-described process of step ST68 causes the recorded position detection process to be terminated, and the recorded position detection process for the commercial B is completed.

Figure 2:
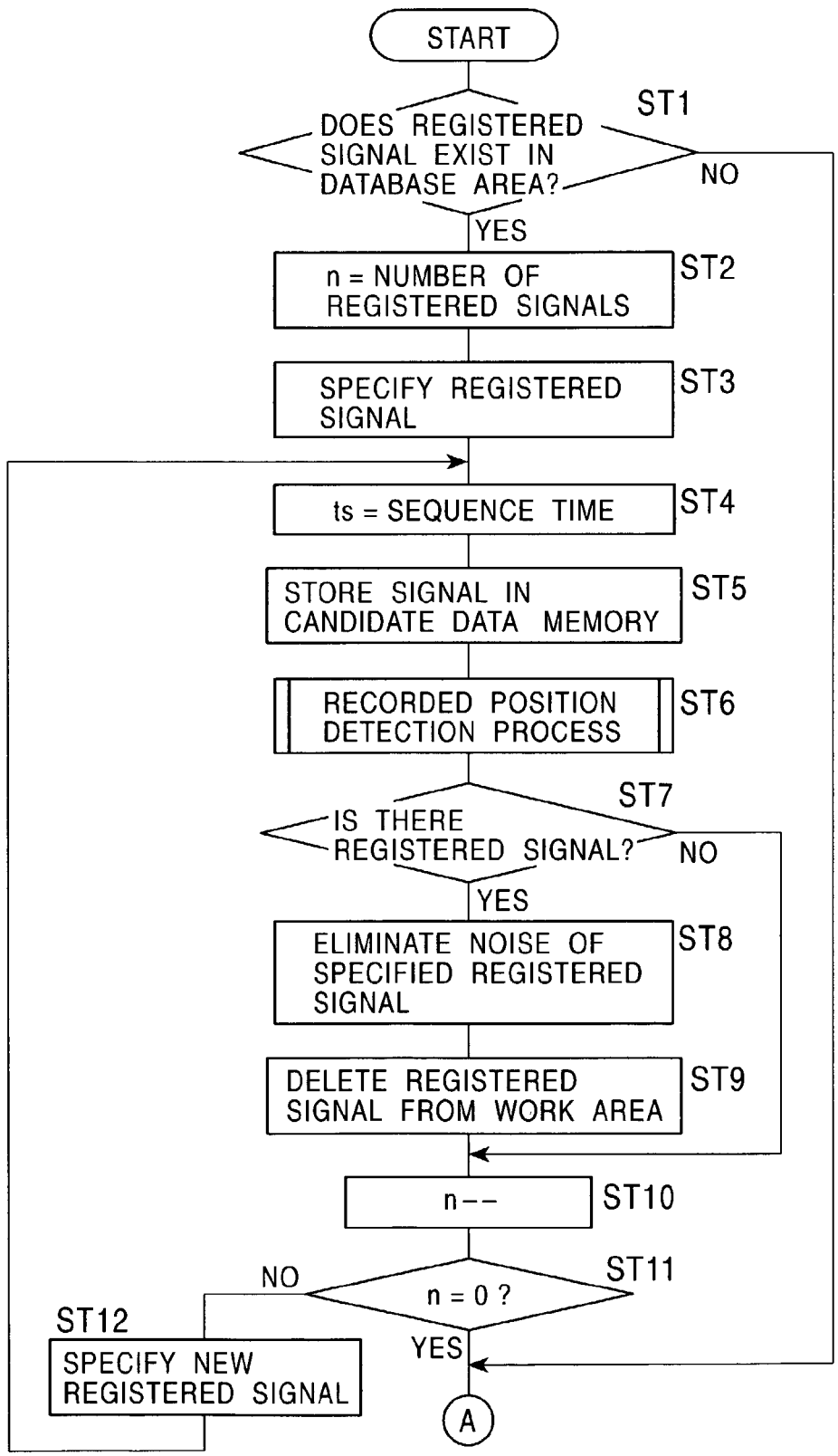
FIG. 2 is a flowchart (1/2) showing the operation of the signal processing apparatus.

When the recorded position detection process is completed and the process proceeds to step ST7 of FIG. 2, it is determined whether or not the registered signal is detected. Here, when the registered signal is detected, the process proceeds to step ST8. Otherwise, the process proceeds to step ST10.

In step ST8, noise of the registered signal is eliminated by using the signal set as the registered signal of the work area 13b. In this elimination of noise, an average value is determined by using the registered signal of the database area 13a and the registered signal detected by the process of step ST6, and this average value is set again as a registered signal, allowing the influence of noise superposed on the registered signal to be reduced. Also, by determining the middle value (median) between the registration signal and the detected registered signal, the noise of the registered signal can be eliminated. In addition, when a large number of registered signals are detected, by determining the value that occurs most frequently (mode), the noise of the registered signal can also be eliminated. In this manner, when the elimination of noise is completed, the process proceeds to step ST9.

In step ST9, by deleting the registered signal from the work area 13b, the free area in the work area 13b is increased. The registered signal is deleted in such a manner that it can be recovered. That is, when the registered signal is deleted, it is assumed that information indicating the registered signal of the database area 13a, which is determined to be a signal with identical content, is provided. For example, it is assumed that information indicating the position at which the registered signal which is determined to be a signal with identical content to that of the deleted registered signal, and management information of the registered signal which is determined to be a signal with identical content to that of the deleted registered signal are provided at the position of the deleted registered signal or at a position which is immediately previous with respect to time. In this manner, by deleting the registered signal in such a manner that it can be recovered, even after the registered signal is deleted, it is possible to output a video output signal SVout which is the same as that before the registered signal is deleted by using information indicating the registered signal.

When the process proceeds from step ST7 or ST9 to step ST10, in this step, a value such that 1 is subtracted from a variable n is set to be a new variable n, and the process proceeds to step ST11.

In step ST11, it is determined whether or not the value of the variable n is "0". Here, when the variable n is not "0", since the registered signal which is not used in the recorded position detection process remains in the database area 13a, the process proceeds to step ST12, where a new registered signal is set. Then, the process returns to step ST4, and the same processes are performed. When the variable n becomes "0", since the recorded position detection process using the registered signal registered in the database area 13a and the deletion of the registered signal are completed, the process proceeds to step ST21 of FIG. 3.

Here, when the signals of the commercials B and C are registered in the database area 13a as shown in FIG. 5A and when signals are recorded in the work area 13b as shown in FIG. 5B, after the signal which is determined to be a signal with identical content to that of the commercial B is deleted from the work area 13b, and the signal with identical content to that of the commercial C is deleted from the work area 13b. Thus, the signal recording areas of the commercials B and C of the work area 13b are made to be free areas (areas indicated by hatching), as shown in FIG. 5C.

In this manner, the recorded position detection process is performed using the registered signal registered in the database area 13a, and by deleting the detected registered signal in such a manner that it can be recovered from the work area 13b, the work area 13b can be used effectively. Furthermore, since noise of the registered signal registered in the database area 13a can be eliminated by using the detected registered signal, a satisfactory signal with a small amount of noise can be registered in the database area 13a.

Figure 3:
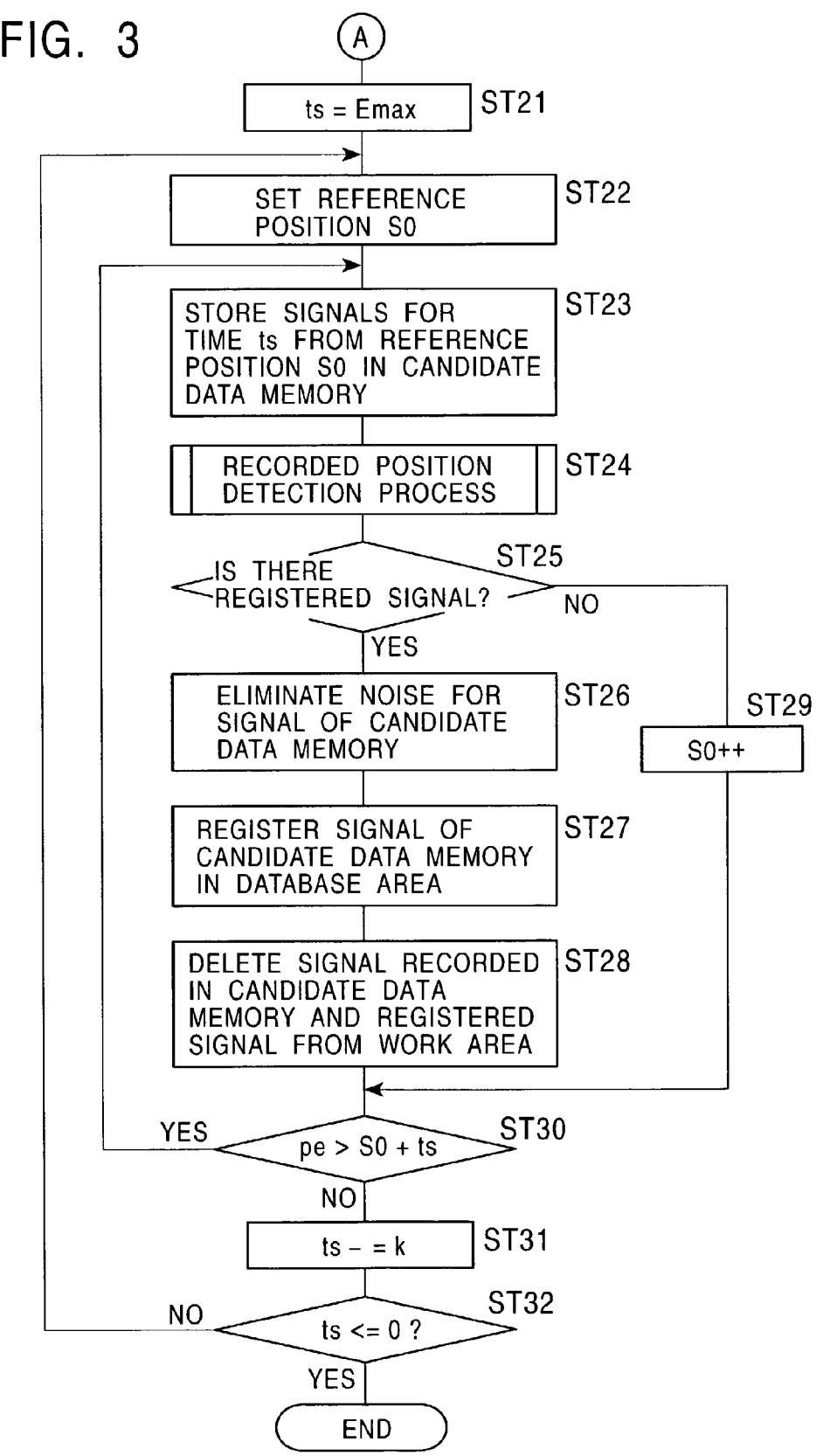
FIG. 3 is a flowchart (2/2) showing the operation of the signal processing apparatus.

Next, when the process proceeds from step ST1 or ST11 to step ST21 of FIG. 3, in this step, a maximum time Emax of the signal to be registered in the database area 13a is set as a sequence time "ts". Here, when the signal of a commercial is to be registered in the database area 13a, the signal of a commercial is generally assumed to be a multiple of 15 seconds in the manner described above. Therefore, the signal of a commercial to be registered is set to one of 15, 30, 45, and 60 seconds, and 60 seconds, which is the maximum time, is set as the sequence time "ts". The time interval of the sequence time "ts" to be set is denoted as "K". That is, when the sequence time "ts" is set to 15, 30, 45, or 60 seconds, the time interval K becomes 15 seconds.

Next, in step ST22, the start of the signal recording position in the work area 13b is set as a reference position S0, and the process proceeds to step ST23.

In step ST23, a video coded signal for the sequence time "ts" from the reference position S0 is read from the work area 13b of the data storage section 13, and the signal is decoded by the video decoder 113. Thereafter, the signal is stored in the candidate data memory 141 of the comparison processing section 14, and the process proceeds to step ST24.

In step ST24, by performing the same recorded position detection process as in step ST6, a registered signal which is the same as the candidate signal stored in the candidate data memory 141 is detected. In the recorded position detection process of step ST24, since the signal for the sequence time "ts" from the reference position S0 is stored in the candidate data memory 141, a position at which the sequence time "ts" has passed from the reference position S0 is set as a detection start position R0.

In step ST25, it is determined whether or not a registered signal is detected by the recorded position detection process of step ST24. Here, when the registered signal is detected, the process proceeds to step ST26. Otherwise, the process proceeds to step ST29.

In step ST26, noise of the candidate signal stored in the candidate data memory 141 is eliminated by using the detected registered signal in the manner described above, and the process proceeds to step ST27. In step ST27, the candidate signal whose noise is eliminated is registered in the database area 13a of the data storage section 13. That is, the candidate signal whose noise is eliminated is coded by the video encoder 112, and the resulting signal is recorded as a registered signal in the database area 13a of the data storage section 13.

Next, in step ST28, the candidate signal, which is read into the candidate data memory 141, and the registered signal are deleted from the work area 13b in order to increase the free area in the work area 13b, and the process proceeds to step ST30. Furthermore, by making the candidate signal, stored in the candidate data memory 141, and the registered signal to be erasable and recoverable in the manner described above, it is possible to output a video output signal SVout which is the same as that before being deleted when the deleted signal is reproduced.

In step ST29, for example, one frame is added to the reference position S0 so as to set the position as a new reference position S0, and then the process proceeds to step ST30. When the signal recorded in the work area 13b is deleted, the new reference position S0 is set with this area being skipped.

When the process proceeds from step ST28 or ST29 to step ST30, it is determined in this step whether or not the position at which the sequence time "ts" is added to the reference position S0 exceeds the recording end position "pe" in the work area 13b. Here, the position does not exceed the recording end position "pe", the process returns to step ST23, where a signal for the sequence time "ts" from the reference position S0 is stored in the candidate data memory 141, and a recorded position detection process is performed. Furthermore, when the position exceeds the recording end position "pe", since the signal for the sequence time "ts" cannot be stored in the candidate data memory 141, the process proceeds to step ST31.

In step ST31, the time interval K is subtracted from the sequence time "ts" in order to set the time to a new sequence time "ts", and then the process proceeds to step ST32, where it is determined whether or not the sequence time "ts" is equal to or less than "0". Here, when it is not determined that the sequence time "ts" is equal to or less than "0", the process returns to step ST22, where the signal with identical content is detected in the new sequence time "ts". When it is determined that the sequence time "ts" is equal to or less than "0", the processing is terminated. By making the time interval K variable according to the time of the content to be detected, a signal of content of a desired time length can be detected.

Here, when the signals of the commercials B and C are deleted from the work area 13b by the process shown in FIG. 2, as shown in FIG. 5C, a start position p11 of a program PG following the first commercial C is set as a reference position S0, and a signal for the sequence time "ts" from this reference position S0 is stored in the candidate data memory 141. Here, when the signal of a commercial to be registered is set to one of 15, 30, 45, and 60 seconds, a signal of 60 seconds, which is the maximum time, is stored in the candidate data memory 141. Furthermore, a position p12 at which the sequence time "ts" has passed from the reference position S0 is set as the detection start position R0, and a recorded position detection process is performed. Here, when the registered signal is not detected, a position which is moved by one frame from the position p11 is set as the reference position S0, and a recorded position detection process is performed.

Thereafter, the reference position S0 is set to a start position p13 of the commercial A of 60 seconds, and when the signal of this commercial A is stored in the candidate data memory 141 and a recorded position detection process is performed, the signals of the commercial A from positions p14 and p15 are detected as the registered signals. When the registered signals are detected in this manner, the noise of the candidate signal stored in the candidate data memory 141, that is, the signal of the commercial A, is eliminated, and the noise-eliminated signal of the commercial A is registered in the database area 13*a*, as shown in FIG. 5D. Furthermore, the signal read into the candidate data memory 141 and the registered signal are deleted from the work area 13*b*, and as shown in FIG. 5E, the area in which the signal of the commercial A is recorded becomes free areas.

Furthermore, when a position p16 is set as a reference position S0 and when a position at which the sequence time "ts" is added to the reference position S0 exceeds the recording end position "pe" in the work area 13*b*, detection and registration of a commercial of 60 seconds are completed, the sequence time "ts" is set to 45 seconds in order to detect a commercial of 45 seconds, and the same processes are performed. Thereafter, the sequence time "ts" is changed to 30 seconds and 15 seconds, and the same processes are performed. As a result, as shown in FIG. 5F, in addition to the video coded signals of the commercials B and C, the video coded signals of the commercials A, D, and E are registered in the database area 13*a*. Furthermore, as shown in FIG. 5G, the signals of the commercials A, B, C, D, and E are deleted in the work area 13*b*, and the free areas indicated by hatching are increased. Of course, the audio signal is registered and deleted in such a manner as to correspond to the video signal.

Although in the above-described embodiments, the video coded signal is stored in the data storage section 13, a signal which is not subjected to a coding process may be stored in the data storage section 13. When the video coded signal is to be stored in the data storage section 13, a comparison process may be performed without decoding the video coded signal. For example, when shifting between a program PG and a commercial and shifting between commercials can be detected by a closed GOP (Group of Pictures) flag and a broken link flag, a signal for a predetermined time from the switching position indicated by these flags or a signal when the time until the flag is detected next from the switching position indicated by the flag is shorter than the maximum time of the commercial, is stored in the candidate data memory 141, and the signal indicating the number of pictures, which are stored in the candidate data memory 141 from when the flag is detected, is stored in the comparison data memory 142. Furthermore, the data comparison circuit determines whether or not the structure of the GOP is the same and the amount of data of each picture is nearly equal, and determines whether or not the content of the signal stored in the candidate data memory 141 is the same as the content of the signal stored in the comparison data memory 142. Based on the determination result, registration and deletion of the video coded signal may be performed in the manner described above.

Furthermore, by setting the picture of an intra-coded image as the reference position S0, by storing pictures for the sequence time "ts" in a memory, and by detecting the picture of the intra-coded image so as to set the picture as the detection start position R0, detection and registration of a commercial may be performed.

Although in the above-described embodiments, the operation when a commercial is detected and registered is described, by changing the sequence time "ts", not only the signal of the commercial, but also another signal can also be detected and registered. For example, the signal of the same content like the title display portion and the ending portion of a drama which is broadcast a plurality of number of times can be detected and registered.

Furthermore, an audio signal is recorded in the candidate data memory 141 and in the comparison data memory 142, and a determination is made as to whether or not the signals nearly match. The audio signal in a period in which they nearly match can be registered as a registered signal in the database area 13*a*, and the registered audio signal can also be deleted from the work area 13*b*.

Furthermore, in the data storage section 13, if the database area 13*a* and the work area 13*b* are provided in a removable recording medium, even when the recording medium is used in another apparatus, after the signal with identical content is deleted, the signal which is the same as that before being deleted can be obtained. Furthermore, if a recording area of a removable recording medium is used as the work area 13*b* and if the database area 13*a* is provided in a hard disk within a signal processing apparatus, many signals of content can be recorded in a removable recording medium. Furthermore, the recording medium is not limited to an optical disk, a hard disk, etc., and, of course, a semiconductor memory or various media may be used.

In the manner described above, according to the above-described embodiments, signals with identical content are detected from the work area 13*b* of the data storage section 13, the duplicate signal is registered in the database area 13*a*, and the duplicate signal is deleted in such a manner that it can be recovered from the work area 13*b*. Therefore, the data storage section 13 can be used efficiently. Furthermore, since the signal to be registered in the database area 13*a* is subjected to a noise elimination process, a satisfactory signal with a small amount of noise can be registered in the database area. Furthermore, since the signals with identical content are detected, a commercial, etc., can be detected regardless of the presence or absence of the changing of the sound mode.

What is claimed is:

1. A signal processing method comprising the steps of:
reading a signal having a predetermined time length from signals of content recorded on recording means, assuming the signal to be a candidate signal, reading a signal differing from said candidate signal having said predetermined time length from the signals of content and assuming the signal to be a comparison signal;
comparing said candidate signal with said comparison signal in sequence by shifting a signal reading position of said candidate signal and a signal reading position of said comparison signal to generate a comparison result; and
detecting, based on the comparison result, a signal of identical content from said recording means,
wherein, when the signals are determined to be signals with identical content, a signal with the identical content is stored as said candidate signal in candidate signal storage means, and
wherein, when said candidate signal is stored in said candidate signal storage means, noise of said candidate signal is eliminated by using said comparison signal which is determined to be said signal with identical content.

2. A signal processing method according to claim 1, wherein, in the comparison between said candidate signal and said comparison signal, a determination value is determined by accumulating the amount of error between said candidate signal and said comparison signal for said predetermined time, and if said determination value is less than a determination reference value, it is determined that said candidate signal and said comparison signal are signals with identical content.

3. A signal processing method according to claim 1, wherein the signal reading position of said comparison signal is shifted in sequence, when the reading of the signal as said comparison signal from said recording means is completed, said candidate signal is updated by shifting again the signal reading position of said candidate signal from said recording means, and the signal reading position of said comparison signal from said recording means is shifted in sequence.

4. A signal processing method according to claim 1, wherein said predetermined time is changed, and said candidate signal and said comparison signal are read.

5. A signal processing method according to claim 1, wherein, the candidate signal stored in said candidate signal storage means is read to detect a signal with identical content, and when the reading of the candidate signal recorded in said candidate signal storage means is completed, a signal is read from said recording means as said candidate signal.

6. A signal processing method according to claim 1, wherein a signal with identical content to that of said candidate signal stored in said candidate signal storage means is deleted in such a manner that the signal can be recovered from said recording means.

7. A signal processing method according to claim 1, wherein a portion of said recording means is used as said candidate signal storage means.

8. A signal processing apparatus comprising:
recording means for recording a signal of content;
candidate signal holding means for reading, as a candidate signal, a signal having a predetermined time length from signals of content recorded on said recording means and storing said candidate signal;
comparison signal holding means for reading, as a comparison signal, a signal differing from said candidate signal having said predetermined time length from the signals of content and storing said comparison signal;
comparison means for comparing the candidate signal stored in said candidate signal holding means with said comparison signal stored in said comparison signal holding means in order to determine whether or not the content of said candidate signal matches the content of said comparison signal, and for generating a comparison result;
control means for supplying a signal having said predetermined time length from said recording means to said candidate signal holding means and said comparison signal holding means, for shifting in time the signal reading position of said candidate signal from said recording means and the signal reading position of said comparison signal therefrom, and for detecting a signal with identical content from said recording means on the basis of the comparison result of said comparison means; and
candidate signal storage means for storing said candidate signal which is determined to be signals with identical content,
wherein noise of said candidate signal is eliminated by using said comparison signal which is determined to be said signal with identical content, and said candidate signal whose noise is eliminated is stored in said candidate signal storage means.

9. A signal processing apparatus according to claim 8, wherein said comparison means determines a determination value by accumulating the amount of error between said candidate signal and said comparison signal for said predetermined time, and determines that said candidate signal and said comparison signal are signals with identical content when said determination value is less than a determination reference value.

10. A signal processing apparatus according to claim 8, wherein said control means shifts the signal reading position of said comparison signal from said recording means, shifts the signal reading position of said candidate signal from said recording means and updates said candidate signal to be stored in said candidate signal storage means when reading said comparison signal from said recording means is completed, and shifts again the signal reading position of said comparison signal from said recording means.

11. A signal processing apparatus according to claim 8, wherein said control means changes said predetermined time and reads said candidate signal and said comparison signal.

12. A signal processing apparatus according to claim 8, wherein, when the candidate signal is stored in said candidate signal storage means, said control means reads the candidate signal stored in said candidate signal storage means into said candidate signal holding means, detects a signal with identical content from said recording means, and reads the signal into said candidate signal holding means from said recording means when the reading of the candidate signal stored in said candidate signal storage means is completed.

13. A signal processing apparatus according to claim 8, wherein said control means deletes a signal with identical content to the content of said candidate signal stored in said candidate signal storage means in such a manner that the signal can be recovered from the recording means.

14. A signal processing apparatus according to claim 8, wherein a portion of the recording area of said recording means is used as said candidate signal storage means.

* * * * *